United States Patent [19]
Stout

[11] Patent Number: 5,133,333
[45] Date of Patent: Jul. 28, 1992

[54] UNIVERSAL COOKING GRILL LINER

[76] Inventor: Everett L. Stout, 304 Pitts Dr., Columbia, Tenn. 38401

[21] Appl. No.: 558,216

[22] Filed: Jul. 26, 1990

[51] Int. Cl.$^5$ .................................................. F24B 3/00
[52] U.S. Cl. .............................. 126/25 R; 126/152 A; 126/25 A; 126/39 M; 108/35
[58] Field of Search ................ 126/39 M, 337 R, 332, 126/25 R, 152 B, 152 A, 25 A; 211/134, 149, 203; 108/115, 117, 120, 125, 127, 35

[56] References Cited

U.S. PATENT DOCUMENTS

| | | | |
|---|---|---|---|
| 1,435,747 | 11/1922 | Seiling | 108/35 X |
| 3,905,286 | 9/1975 | LeGrady | 126/25 R X |
| 4,510,855 | 4/1985 | Anner | 126/25 R X |
| 4,667,652 | 5/1987 | Bunton | 126/332 X |
| 4,920,950 | 5/1990 | Johnson | 126/9 R X |
| 4,942,862 | 7/1990 | Alden et al. | 126/337 R |
| 4,977,824 | 12/1990 | Shinler | 126/25 R X |

*Primary Examiner*—Larry Jones

[57] ABSTRACT

A portable cooking area liner for all types of outdoor grills. The device comprises a frame with necessary supports to allow cooking on said liner, yet preventing food from touching the original grid area.

1 Claim, 1 Drawing Sheet

UNIVERSAL COOKING GRILL LINER

BACKGROUND OF THE INVENTION

Many types of Charcoal Grills have been invented over past years as required to fill the needs for outdoor cooking. Many of these do not meet the needs of the public who camp and cook outdoors today. The present invention relates to a grid that will lie on the existing grill on top of the existing grid. This grill liner can easily be used in the home type gas or charcoal grill or can easily be taken on camping trips or used as a liner for grills in roadside rest areas or state parks, etc.

DESCRIPTION OF THE PRIOR ARTS

Many types of outdoor grills have been manufactured over the past years, trying to fill the needs and desires of the people that cook outdoor. It is believed that there are no prior art grill liners for the cooking surface of a charcoal or gas cooking grill. It is believed that none of the above features of the novel of the present invention are found in the prior art.

SUMMARY OF THE INVENTION

It is the primary object of the present invention to provide a portable liner that can easily be stored in the trunk of a car and taken to a cookout areas, yet small enough to conveniently be taken on camping trips, while giving the user a private cooking surface.

Another object of the present invention is to provide the public with a grill liner which can be used in virtually any cooking grill.

Yet another object of the present invention is to provide a grill cooking surface liner capable of laying on top of the existing grid and to prevent food from coming in contact with the existing grid.

It is a further object of the present invention to provide a liner comprising:

A. Various number of parts as required to manufacture the present invention in such shape or configuration as desired.
B. To provide a grill liner, which is inexpensive, while easy to use, easy to store, convenient to take on trips for cookouts.
C. Having leg assemblies to support the liner, allowing it to be used independently as a grill.

It is yet another object of the present invention to provide such a device that is inexpensive to manufacture and maintain while retaining its effectiveness and durability.

PREFERRED EMBODIMENT

Figure 1:
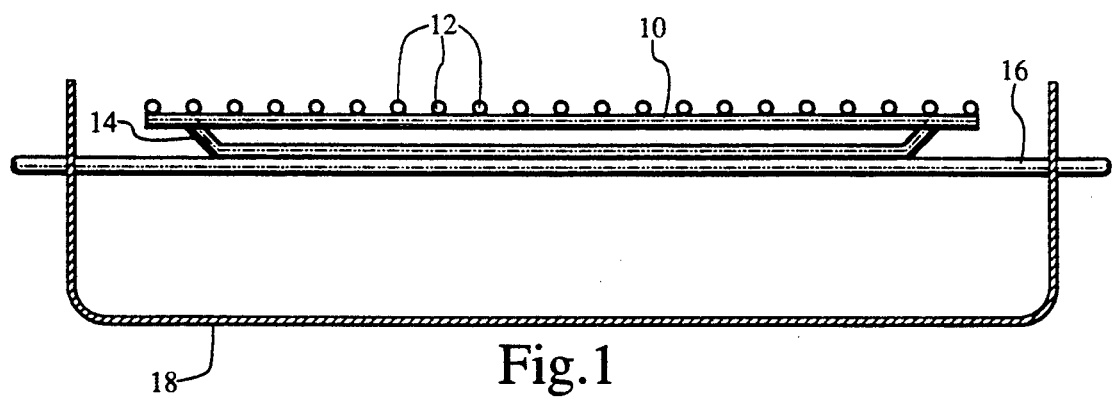
FIG. 1 a prospective view of the liner as used with a grill.
Figure 2:
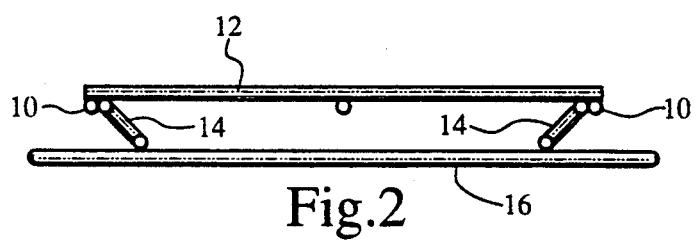
FIG. 2 an end prospective view of the liner as used with a grill.
Figure 3:
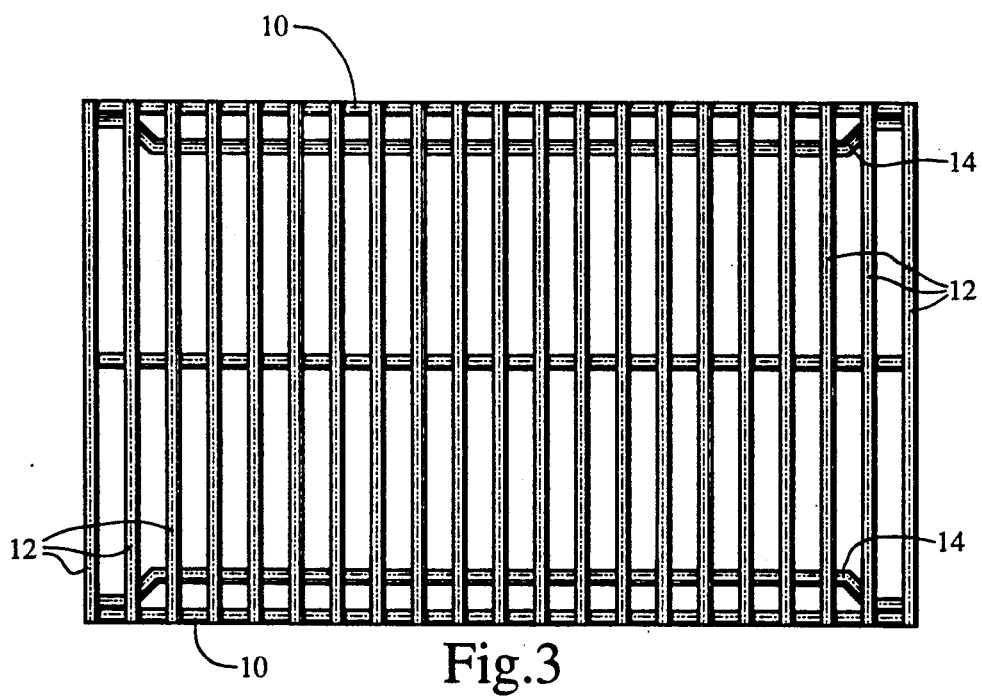
FIG. 3 a top view of grill liner.
Figure 4:
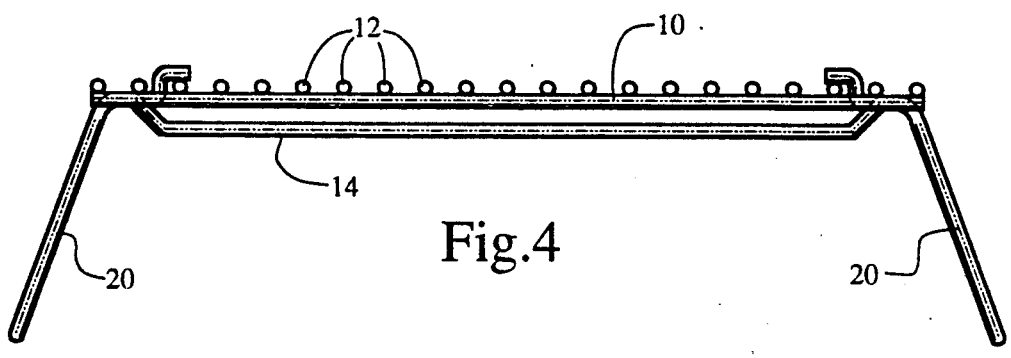
FIG. 4 a prospective view as used with leg assemblies.

Referring now to FIG. 1 it is seen that the present invention consist of frame 10, and with support 14, which holds the cooking area above the existing grill, the cross bars 12, are to support the food while being cooked. Sixteen (16) represents the existing grid in the existing grill. FIG. 4 shows leg assemblies 20.

It is believed that the foregoing description conveys the best understanding of the objects and advantages of the present invention. Different embodiments may be made of the inventive concept of this invention. It is to be understood that all matters disclosed herein are to be interpreted merely as illustrative, and not in a limiting sense.

Thus the reader will see that the cooking grill liner provides a highly reliable, yet economical device that can be used by any person capable of cooking on an outdoor grill.

While the above description contains many specificities, these should not be construed as limitations of the scope of the invention, but rather as an exemplification of one preferred embodiment thereof. Many other variations as possible.

Accordingly, the scope of the invention should be determined not by the embodiment illustrated, but by the appended claims and their legal equivalents.

What I claim is:

1. A portable grill liner for use with an existing charcoal grill comprising a plurality of crossbars which overly and are perpendicularly disposed to at least two frame members which each have associated therewith a support member including a portion which extends below the plane of the supports and frame members and acts to space the grill liner above an existing grill;

the portable grill liner further including a pair of leg assemblies which include means for frictionally engaging a pair of adjacent crossbars on respectively opposite sides thereof to engage the leg assemblies in operative position below the crossbars.

* * * * *